(12) United States Patent
Chapman et al.

(10) Patent No.: US 7,658,155 B2
(45) Date of Patent: Feb. 9, 2010

(54) WASTE TREATMENT PROCESS AND APPARATUS

(75) Inventors: Chris Chapman, Gloucester (GB); David Ovens, Oxfordshire (GB); David Deegan, Oxfordshire (GB); Saeed Ismail, Swindon (GB)

(73) Assignee: Advanced Plasma Power Limited, St. Albans, Hertfordshire (GB)

( * ) Notice: Subject to any disclaimer, the term of this patent is extended or adjusted under 35 U.S.C. 154(b) by 0 days.

(21) Appl. No.: 11/577,336

(22) PCT Filed: Jun. 6, 2006

(86) PCT No.: PCT/GB2006/002409

§ 371 (c)(1),
(2), (4) Date: Apr. 16, 2007

(87) PCT Pub. No.: WO2007/000607

PCT Pub. Date: Jan. 4, 2007

(65) Prior Publication Data

US 2008/0097137 A1    Apr. 24, 2008

(30) Foreign Application Priority Data

| Jun. 29, 2005 | (GB) | ................................. | 0513299.8 |
| Mar. 8, 2006 | (GB) | ................................. | 0604691.6 |

(51) Int. Cl.
| B09B 3/00 | (2006.01) |
| F23D 14/00 | (2006.01) |
| F23G 5/00 | (2006.01) |
| F23G 7/00 | (2006.01) |
| F23G 5/12 | (2006.01) |
| A47J 36/00 | (2006.01) |
| A47J 36/24 | (2006.01) |
| B23K 9/00 | (2006.01) |
| B23K 9/02 | (2006.01) |
| A62D 3/19 | (2007.01) |

(52) U.S. Cl. ...................... 110/346; 110/236; 110/246; 110/251; 110/252; 110/259; 219/121.36; 219/121.38; 588/311

(58) Field of Classification Search ................. 588/311; 110/250, 346; 219/121.36, 121.38
See application file for complete search history.

(56) References Cited

U.S. PATENT DOCUMENTS 3,736,111 A  *  5/1973  Gardner et al. ................. 48/111

(Continued)

FOREIGN PATENT DOCUMENTS

CA          2339457          9/2002

(Continued)

OTHER PUBLICATIONS

International Search Report, PCT/GB2006/002409, dated Sep. 27, 2006, 3 pages.

(Continued)

*Primary Examiner*—Stanley Silverman
*Assistant Examiner*—Jennifer A Smith
(74) *Attorney, Agent, or Firm*—Senniger Powers LLP

(57) ABSTRACT

A process for the treatment of waste, the process comprising: (i) either (a) a gasification step comprising treating the waste in a gasification unit in the presence of oxygen and steam to produce an offgas and a char, or (b) a pyrolysis step comprising treating the waste in a pyrolysis unit to produce an offgas and a char; and (ii) a plasma treatment step comprising subjecting the offgas and the char to a plasma treatment in a plasma treatment unit in the presence of oxygen and, optionally, steam.

46 Claims, 5 Drawing Sheets

U.S. PATENT DOCUMENTS

| | | | |
|---|---|---|---|
| 4,289,625 A | | 9/1981 | Tarman et al. |
| 4,718,362 A | | 1/1988 | Santen et al. |
| 5,347,938 A | * | 9/1994 | Takazawa ................... 110/346 |
| 5,541,386 A | | 7/1996 | Alvi et al. |
| 5,657,706 A | * | 8/1997 | Liagre et al. ................ 110/250 |
| 6,021,723 A | | 2/2000 | Vallomy |
| 6,200,475 B1 | * | 3/2001 | Chen .......................... 210/613 |
| 6,294,351 B1 | | 9/2001 | Lin et al. |
| 6,455,011 B1 | * | 9/2002 | Fujimura et al. ............ 422/139 |
| 6,638,396 B1 | | 10/2003 | Hogan |
| 6,810,821 B2 | * | 11/2004 | Chan .......................... 110/345 |
| 2008/0097137 A1 | * | 4/2008 | Chapman et al. ............ 588/311 |

FOREIGN PATENT DOCUMENTS

| | | | |
|---|---|---|---|
| EP | 0952393 | | 10/1999 |
| EP | 0952393 A1 | * | 10/1999 |
| GB | 2169310 A | | 7/1986 |
| WO | 2004060587 | | 7/2004 |

OTHER PUBLICATIONS

Abstract of JP No. 2003147373; May 21, 2003.
Abstract of RU No. 2047650; Nov. 10, 1995.
Abstract of RU No. 2171431; Jul. 27, 2001.
Abstract of BG No. 109245; Nov. 30, 2005.
Abstract of BG No. 109247; Nov. 30, 2005.
Abstract of DE No. 19745422; Apr. 22, 1999.
International Preliminary Report on Patentability, PCT/GB2006/002409, dated Sep. 28, 2007, 8 pages.

* cited by examiner

WASTE TREATMENT PROCESS AND APPARATUS

TECHNICAL FIELD

The present invention relates to a process for treating waste, particularly municipal waste.

BACKGROUND ART

Municipal waste has traditionally been disposed of in landfill sites. However, the environmental hazards of doing so are becoming a major concern and therefore an effort has been made in recent years to develop waste-treatment processes that reduce the volume of the waste material and the amount of potentially environmentally hazardous constituents in the treated material.

Processes that have been developed to treat waste include combustion systems, in which the waste is thermally processed with stoichiometric or excess amounts of oxygen. The process is normally carried out in air. Examples of combustion systems include: mass-fired combustion systems, refuse derived fuel (RDF) combustion systems, in which the RDF is typically burnt on a travelling grate stoker, and fluidised bed combustion.

Another method of processing waste involves using pyrolysis, i.e. pyrolysing the waste in a pyrolysis unit. The term pyrolysis means, in the field of waste treatment, the thermal processing of waste in the absence of oxygen. Generally pyrolysis processes are endothermic and so require the input of thermal energy for the pyrolysis to continue. This contrasts with combustion, which is an exothermic process, and as such does not require the additional input of heat once the combustion has been initiated. The pyrolysis process converts many of the organic constituents found in waste to gaseous, liquid and solid fractions using a combination of thermal cracking and condensation reactions. Pyrolysis generally results in three products: a gas stream, primarily containing hydrogen, methane, carbon monoxide, carbon dioxide and other gases; a liquid fraction containing a tar or oil containing acetic acid, acetone, methanol, and complex oxygenated hydrocarbons; a char, consisting of almost pure carbon, plus any originally inert material originally present in the solid waste. Pyrolysis is a process that is used in the industrial production of charcoal from wood, coke and coke gas from coal, and fuel gas and pitch from heavy petroleum fractions. However, its use in the processing of solid waste has not been successful, one of the reasons for which is that the system requires a consistent feedstock, which is difficult to obtain from municipal waste.

A third method for processing waste involves the gasification of the waste. Gasification is the partial combustion of a material, where the oxygen in the gasification unit is controlled such that it is present at a sub-stoichiometric amount, relative to the waste material. Gasification of waste containing carbonaceous components results in a combustible fuel gas rich in carbon monoxide, hydrogen and some saturated hydrocarbons, principally methane. There are five basic types of gasifier: vertical fixed bed gasifier, horizontal fixed bed gasifier, fluidised bed gasifier, multiple hearth gasifier and rotary kiln gasifier. The first three are in most common use.

Gasification, while being moderately successful in combusting the majority of waste, nevertheless produces a gas that contains uncombusted particulates, low volatility tarry species and airborne compounds. Additionally, although much of the waste is combusted to either a gas or airborne particles, the gasification process still often results in a 'char', i.e. a solid material that contains constituents that will not readily combust or vaporise under the operating conditions of the gasification. The char commonly contains hazardous heavy metal and toxic organic species, which must be disposed of carefully, adding to the cost of the overall waste treatment process. It will be appreciated that there is a desire to reduce the amount of solid waste that results from a waste-treatment process, and also reduce the amount of hazardous materials in the treated waste.

It has also been found that, if the gas that results from the gasification of waste (termed an 'offgas') is used in a gas engine or gas turbine, the airborne particulates and tarry hydrocarbon molecules have a tendency to clog the gas turbine or engine. The gas is therefore not considered to be sufficiently 'clean' and even if the offgas produced by the gasification were to be used, the turbine would require frequent cleaning and maintenance and/or the introduction of an additional costly cleaning stage to remove the tarry products.

There is therefore a desire for a process that will overcome, or at least mitigate, some or all of the problems associated with the methods of the prior art.

SUMMARY OF THE INVENTION

In a first aspect, the present invention provides a process for the treatment of waste, the process comprising
a gasification step comprising treating the waste in a gasification unit to produce an offgas and a char, and
a plasma treatment step comprising subjecting the offgas and the char product to a plasma treatment in a plasma treatment unit. The offgas typically will contain uncombusted solid particles and tarry species.

The first aspect may provide a process for the treatment of waste, the process comprising
(i) either
  (a) a gasification step comprising treating the waste in a gasification unit in the presence of oxygen and steam to produce an offgas and a char, or
  (b) a pyrolysis step comprising treating the waste in a pyrolysis unit to produce an offgas and a char; and
(ii) a plasma treatment step comprising subjecting the offgas and the char to a plasma treatment in a plasma treatment unit in the presence of oxygen and, optionally, steam.

The first aspect may provide a process for the treatment of waste, the process comprising
(i) subjecting the waste to microbial digestion, then
(ii) either
  (a) a gasification step comprising treating the microbially treated waste in a gasification unit to produce an offgas and a char, or
  (b) a pyrolysis step comprising treating the microbially treated waste in a pyrolysis unit to produce an offgas and a char; and
(iii) a plasma treatment step comprising subjecting the offgas and the char to a plasma treatment in a plasma treatment unit.

In the presence of oxygen and steam" indicates that both oxygen gas and steam are present in the gasification unit and/or the plasma treatment unit. Other gases may also be present. Oxygen may be provided as oxygen gas, in a mixture of gases (for example air), and/or in an oxygen-containing compound.

"Steam" includes water in the gaseous form, vapour and water suspended in a gas as droplets. Preferably, the steam is water having a temperature of 100° C. or more. Water, which will be converted to steam, may be introduced into the gasification unit and/or plasma treatment unit in the form of liquid water, a spray of water, which may have a temperature of 100° C. or less, or as vapour having a temperature of 100° C. or more; in use, the heat in the interior of the gasification unit and/or plasma treatment unit ensures that any liquid water, which may be in the form of airborne droplets, is vaporised to steam.

The second aspect may provide an apparatus for carrying out the process of the present invention, the apparatus comprising:
(i) a gasification unit or pyrolysis unit and
(ii) a plasma treatment unit, wherein the gasification unit has inlets for oxygen and steam and the plasma treatment units has an inlet for oxygen and optionally an inlet for steam.

The second aspect may provide an apparatus for carrying out the process of the present invention, the apparatus comprising:
(i) a microbial digestion unit,
(ii) a gasification or pyrolysis unit, and
(iii) a plasma treatment unit.

Preferred features of the present invention are described in the dependent claims and in the Detailed Description below.

The present invention will now be further described. In the following passages different aspects of then invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

BRIEF DESCRIPTION OF THE FIGURES

The following figures are provided by way of example and show non-limiting embodiments of the present invention.

DETAILED DESCRIPTION

Figure 1:
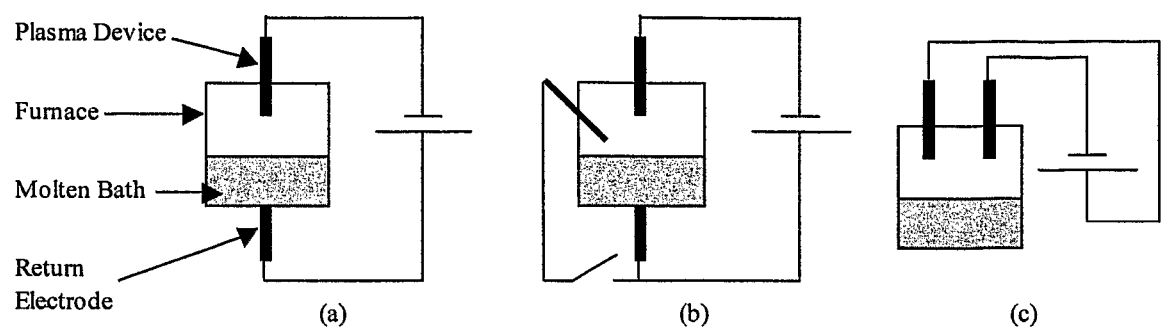
FIGS. 1(a) to (c) show schematic drawings of a plasma furnace having two electrodes in three possible configurations.

Having regard to the problems associated with gasification processes, a proposed solution considered by the present inventors was to use a plasma treatment in place of the gasification treatment. The inventors found, however, that the amount of energy required to gasify the organic fraction of the waste material in the plasma unit was very high and only relatively small volumes of solid waste could be treated at any one time. As such, the treatment of unprocessed waste using plasma was found not to be economically viable. The inventors have now found, however, that by first treating the waste in a gasification unit, followed by treatment in a plasma unit, a number of advantages over the prior art processes can be obtained. In particular, this combination has been found to be surprisingly energy efficient. It has also been found that the combination of the gasification treatment and the plasma treatment results in a relatively clean syngas (containing very low concentrations of airborne particulates), very low amounts of hazardous tar and heavy metal species and smaller amounts of solid material in the cleaned gas product.

The treatment of the offgas in a plasma unit has been found to significantly reduce the number of airborne particulates and tarry hydrocarbon compounds, which have a tendency to create fouling problems if used in a turbine. The treatment of the char in the plasma unit has been found to convert much of the char material to a gas, and, in particular, a gas that has a relatively low content of airborne particulates and tarry gaseous hydrocarbons, which could clog a turbine. The plasma also has the advantage that various environmentally harmful airborne particulates and gases are degraded to less harmful species during the plasma process.

Preferably, the process involves introducing a waste material, i.e. a waste feedstock, that is substantially homogenous to the gasification unit. This has been found to improve the efficiency of the treatment process as a whole. The waste feedstock may have been pre-treated to increase its homogeneity prior to introduction to the gasification unit. "Homogenous" indicates that the waste should have one or more properties which do not vary to a great extent throughout the bulk of the waste or from batch to batch, if the waste feedstock is fed in batches to the gasifier; hence the value of the property in question does not vary to a great extent as the waste is fed to the gasification unit. Such properties that preferably do not vary to a great extent include the calorific value, the size of constituents, moisture content, ash content, and density of the waste material. Preferably one or more of these properties varies by 20% or less, preferably 15% or less, more preferably 10% or less. Preferably, the calorific value and the moisture content of the waste being fed to the gasifier are relatively consistent during the process.

The consistency of the property/properties of interest may be measured by taking samples of the same weight from either (i) a given number of batches of the feedstock fed to the gasifier over a period of time (if the feedstock is fed batchwise to the gasifier) or (ii) at given intervals of time if the feedstock is fed substantially continuously to the gasifier. Sampling methods known to the skilled person may be used to measure the consistency of the waste feedstock.

For example, over a period of 1 hour of running the process, the calorific value of samples of the waste (of the same weight, e.g. 1 kg or 10 kg) being fed to the gasifier taken at regular (e.g. 5 to 10 minutes or 3 to 4 hours) intervals preferably varies by 20% or less, more preferably 15% or less, most preferably 10% or less. On an absolute scale, the waste feedstock typically has a mean calorific value of around 15 MJ/kg, and preferably has a (+/−) variation from the mean calorific value of less than 3 MJ/kg, preferably less than 1.5 MJ/Kg. The moisture content of the waste feedstock is preferably as low as possible, as discussed in more detail below. The average (mean) calorific value of the waste feedstock (which may be calculated from a variety of samples taken at regular intervals, as described above) is preferably 11 MJ/Kg or above, more preferably 13 MJ/Kg or above, most preferably 15-17 MJ/Kg.

The waste feedstock, i.e. the waste fed to the gasifier (which may comprise refuse derived fuel), preferably has a moisture content of 30% or less by weight, preferably 20% or less by weight, more preferably 15% or less by weight. The moisture content of the waste feedstock preferably varies by 10% or less, more preferably by 5% or less. The moisture content of the waste feedstock may be controlled using processes known to those skilled in the art, such as drying, or by using the microbial digestion processes described herein.

Typical moisture content of refuse derived fuel may be in the range of 20 to 40% by weight. Preferably, the moisture content of the refused derived fuel is reduced to the preferred amounts for the waste feedstock described above.

The process may further comprise the step of drying the waste before its treatment in the gasification or pyrolysis step. The waste may be dried by using the heat produced in any of the other steps of the process, such as heat from the pyrolysis, gasification and/or plasma treatment steps. Heat may be transferred to the waste for the purposes of drying by contacting it with heated air or steam, which may in turn have been heated from the heat produced in any of the other steps. The waste may be dried by blowing heated air or steam over or through the waste.

The waste feedstock preferably contains a high proportion (preferably 85% or more of the number of particles, more preferably 95% or more of the number of particles) of particles having a particle size of 50 mm or less. A particle's size is measured across the particle at its largest dimension. Preferably the feedstock contains 50% or more (by number) of particles having a particle size of 30 mm or less.

A typical analysis of the waste feedstock content would be as follows:

Gross calorific value: 13.2 MJ/Kg

Moisture: 25%

Ash: 13.05%

Fixed carbon: 12.17%

Volatile matter: 49.78%

Particle size: 85%<50 mm

Various processes may be used to homogenise various properties of the waste material, for example: microbial digestion, picking, shredding, drying, screening, mixing and blending. Of these, microbial digestion is preferred and this process is explained in more detail below.

A suitable waste material for use in the gasification step was analysed in two forms, each form having a different moisture content but otherwise the same components in the same proportions. The waste material contained the components shown in Table 1 below. The fourth column gives the weight % of the components for each sample in the absence of moisture. The gasification unit is preferably adapted to gasify the waste having the content as given in the table below. The elemental analysis (ultimate analysis) of the waste is given in Table 2 below.

TABLE 1

| Component | Weight % (including 12% moisture in the total - form 1) | Weight % (including 25% water in the total - form 2) | Weight % (excluding water from the total) |
| --- | --- | --- | --- |
| Paper and Card | 36.19 | 30.84 | 41.12 |
| Plastic Film | 15.2 | 12.96 | 17.27 |
| Dense Plastic | 2.59 | 2.21 | 2.94 |
| Misc. Combustibles | 6.64 | 5.65 | 7.54 |
| Misc. Non-Combustibles | 2.19 | 1.87 | 2.49 |
| Glass | 3.65 | 3.11 | 4.15 |
| Ferrous Metals | 1.19 | 1.01 | 1.35 |
| Non-Ferrous Metals | 0.28 | 0.24 | 0.32 |
| Vegetable and Putrescible matter | 8.86 | 7.39 | 9.86 |
| Textiles | 4.62 | 3.94 | 5.25 |

TABLE 1-continued

| Component | Weight % (including 12% moisture in the total - form 1) | Weight % (including 25% water in the total - form 2) | Weight % (excluding water from the total) |
| --- | --- | --- | --- |
| Nappies and Pads | 6.78 | 5.78 | 7.71 |
| Moisture | 12.00 | 25.00 | 0 |
| Total (wt %) | 100 | 100 | 100 |

A waste material having been thermally dried may have a moisture content in the range 10-16 wt % of about 12% or less: the above form I of the waste is therefore representative of thermally dried waste. A waste material having been dried by a so-called 'MBT' (Mechanical Biological Treatment, such as rotary aerobic digestion) may have a moisture content of about 25% or less: the above form II is therefore representative of waste that has been subjected to MBT.

TABLE 2

| (Ultimate analysis of waste from Table 1 containing 25% moisture by weight) | | | | | | | | |
| --- | --- | --- | --- | --- | --- | --- | --- | --- |
| C | H | O | S | N | Cl | Ash (other elements) | Moisture Content | |
| 36.9 | 4.9 | 24.12 | 0.15 | 0.5 | 0.5 | 8.03 | 24.9 | 100 |

The elemental amounts of H and O in Table 2 are from the theoretically dry components.

The process according to the present invention comprises a gasification step. The gasification step may, for example, be carried out in a vertical fixed bed (shaft) gasifier, a horizontal fixed bed gasifier, a fluidised bed gasifier, a multiple hearth gasifier or a rotary kiln gasifier.

It should be noted that a horizontal fixed bed gasifier may otherwise be referred to in the prior art as a starved air combustor (incinerator), controlled air combustor, pyrolytic combustor, or a modular combustion unit (MCU).

A horizontal fixed bed gasifier generally comprises two sections: a primary combustion chamber and a secondary combustion chamber. In the primary chamber, waste is gasified by partial combustion under sub-stoichiometric conditions, producing low-calorific gas, which then flows into the secondary combustion chamber, where it is combusted with excess air. The secondary combustion produces high-temperature (650 to 870° C.) gases of complete combustion, which can be used to produce steam or hot water in an optionally attached waste boiler. Lower velocity and turbulence in the primary combustion chamber minimize the entrainment of particulates in the gas stream, leading to lower particulate emissions than conventional excess-air combustors.

Preferably, the gasification step is carried out in a fluid bed gasification unit. Fluid bed gasification has been found to process the waste feedstock more efficiently than the other gasification processes available. The fluid bed technique permits very efficient contacting of the oxidant and waste feed streams leading to rapid gasification rates and close temperature control within the unit.

A typical fluid bed gasification unit may comprise a vertical steel cylinder, usually refractory lined, with a sand bed, a supporting grid plate and air injection nozzles known as tuyeres. When air is forced up through the tuyeres, the bed fluidises and expands up to twice its resting volume. Solid fuels such as coal or refused derived fuel, or in the case of the present invention, the waste feedstock, can be introduced, possibly by means of injection, into the reactor below or above the level of the fluidised bed. The "boiling" action of the fluidised bed promotes turbulence and transfers heat to the waste feedstock. In operation, auxiliary fuel (natural gas or fuel oil) is used to bring the bed up to operating temperature 550° C. to 950° C., preferably 650° C. to 850° C. After start-up, auxiliary fuel is usually not needed.

Preferably the gasification unit, most preferably the fluid bed gasification unit, will be a vertical, cylindrical vessel, which is preferably lined with an appropriate refractory material, preferably comprising alumina silicate.

In a fluid bed gasification unit, the distance between the effective surface formed by the particles of the fluid bed when fluid (i.e. when gas is being fed through the particles from below) and the top of the unit is called the "free board height". In the present invention, the free board height, in use, will preferably be 2.5-5.0 (more preferably 3.5 to 5.0) times the internal diameter of the unit. This geometric configuration of the vessel is designed to permit adequate residence time of the waste within the fluid bed to drive the gasification reactions to completion and also to prevent excessive carry over of particulates into the plasma unit. The gasification unit will preferably employ a heated bed of ceramic particles suspended (fluidized) within a rising column of gas. The particles may be sand-like. The particles may comprise silicon oxide.

Preferably, the waste will be fed continuously to the gasification unit at a controlled rate. If the gasification unit is a fluid bed gasification unit, preferably the waste is fed either directly into the bed or above the bed.

Preferably, the waste feed will be transferred to the gasifier unit using a screw conveyor system, which enables continuous addition of waste. The waste feed system may incorporate an air lock device, such that the waste can be fed into the gasification unit through the air lock device to prevent air ingress or gas egress to/from the interior of the gasifier unit. The waste is preferably fed through the airlock device with additional inert gas purging. Air lock devices are known to the skilled person.

During the gasification process, the gasification unit should be sealed from the surrounding environment to prevent ingress or egress of gases to/from the gasification unit, with the amount of oxygen and/or steam being introduced to the gasification unit as required in a controlled manner.

If the gasification unit is a fluid bed gasification unit, preferably oxidants comprising oxygen and steam are fed below the bed, which may be through a series of upward facing distribution nozzles.

Preferably, the gasification is carried out in the presence of steam and oxygen. As mentioned above, water, which will be converted to steam, may be introduced into the gasification unit in the form of liquid water, a spray of water, which may have a temperature of 100° C. or less, or as vapour having a temperature of 100° C. or more. In use, the heat in the interior of the gasification unit ensures that any liquid water, which may be in the form of airborne droplets, is vaporised to steam. Preferably the steam and oxygen will be closely metered to the unit and the rate of waste feed adjusted to ensure that the gasifier operates within an acceptable regime. The amount of oxygen and steam introduced to the gasification unit relative to the amount of waste will depend on a number of factors including the composition of the waste feed, its moisture content and calorific value. Preferably, the amount of oxygen introduced to the gasification unit during the gasification step is from 300 to 350 kg per 1000 kg of waste fed to the gasification unit. Preferably, the amount of steam introduced to the gasification unit is from 0 to 350 kg per 1000 kg of waste introduced to the gasification unit, optionally from 90 to 300 kg per 1000 kg, of waste or 120 to 300 kg per 1000 kg of waste, most preferably 300-350 kg of waste, if the waste contains less than 20% (optionally less than 18%) by weight moisture. If the waste contains 20% or more (optionally more than 18%) by weight moisture, preferably the amount of steam introduced to the gasification unit is from 0 to 150 kg per 1000 kg of waste. Typical addition amounts of oxygen and steam oxidants for the waste given above in Table 1 are given below in Table 2.

The gasification unit will preferably comprise a fossil fuelled underbed preheat system, which will preferably be used to raise the temperature of the bed prior to commencement of feeding to the unit.

Preferably the gasification unit will comprise multiple pressure and temperature sensors to closely monitor the gasification operation.

For the waste material having the composition given in Table 1 (containing either 12% or 25% water), the addition rate of oxygen and steam will preferably be in the range as indicated in Table 2 below.

TABLE 2

Typical relative addition amounts of oxygen and steam oxidants

| | RDF 12% moisture* | RDF 25% moisture* |
|---|---|---|
| Relative oxygen addition amount (kg per 1000 kg waste) | 300-350 | 300-350 |
| Relative steam addition amount (kg per 1000 kg waste) | 90-300 | 0-100 |

*Based on composition of waste feed (the refuse derived fuel) given in table 1

Preferably the waste will be gasified in the gasification unit at a temperature greater than 650° C., more preferably at a temperature greater than 650° C. up to a temperature of 1000° C., most preferably at a temperature of from 800° C. to 950° C. If a fluid bed gasifier is employed in the present invention, preferably the bed temperature is maintained in the range of from 650-900° C., more preferably in the range of from 750-950° C. and most preferably in the range of from 800-850° C.; this is generally suitable for all waste that does not have a high potash content and no agglomeration (sintering) of the fluid bed particles is observed.

The maximum temperature that can be employed in the fluidised bed of a fluidised gasification unit is dependent on the composition of the ash content of the fuel being treated. In particular, some biomass materials are high in potash, soda and other species that form low melting point eutectics. For these waste containing one or more of these materials, it is especially important to ensure that the temperature of the bed is kept below the sintering temperature of the ash within the waste (which may be as low as ~650° C. in certain cases) to avoid coagulation of the fluid bed particles. The temperature of the fluidised bed may be maintained by controlling the amount of oxidant fed to the gasifier relative to the amount of the solid fuel.

In the fluid bed gasifier, preferably the zone above the fluid bed (sometimes termed the freeboard) may be a higher temperature than the fluid bed. The temperature of the zone above the fluid bed is preferably in the range of from 800-1000° C.

Fluid bed gasification systems are quite versatile and can be operated on a wide variety of fuels, including municipal waste, sludge, biomass materials, coal and numerous chemical wastes. The gasification step of the process of the present invention may comprise using a suitable bed media such as limestone ($CaCO_3$), or, preferably, sand. During operation, the original bed material may be consumed, and may be replaced by recycled graded ash (Char) material from the gasification stage.

Preferably, the gasification unit and the plasma treatment unit are integrated and will typically be in fluid connection. 'Fluid connection' indicates that a conduit is provided for transporting the products of the gasification unit to the plasma treatment unit. Preferably, the whole process is an integrated process, in that all the steps are carried out on one site and means are provided to transport the products from each step to the next. Each step is preferably carried out in a separate unit. In particular, the gasification and the plasma treatment are preferably carried out in separate units, to allow the conditions in each unit to be varied independently. Preferably, means are provided for transporting the products of the gasification step from the gasification unit to the plasma treatment unit.

Pyrolysis, as a process, and pyrolysis units are conventional and known to those skilled in the art and are commercially available.

In an alternative embodiment, the plasma treatment may be conducted in two units to separately treat the solid char and the gasifier off-gas streams.

The process according to the present invention comprises a plasma treatment step. Preferably, the plasma treatment is carried out in the presence of an oxidant. Preferably, the amount of oxidant is controlled. More preferably, the amount of oxidant is controlled such that that the gaseous hydrocarbons (including low volatility, tar products), the airborne carbon particulates, carbon contained in the char and part of the carbon monoxide is converted to carbon monoxide and carbon dioxide, preferably such that the ratio of the $CO/CO_2$ after the plasma treatment stage is equal or greater than the gas exiting the gasifier unit. Preferably, the plasma treatment is carried out on the char until substantially all of the carbon content in the char has been converted to gas or airborne species.

Preferably, the oxidant is oxygen or oxygen and steam. Preferably, the plasma treatment is carried out in the presence of oxygen and steam. As mentioned above, water, which will be converted to steam, may be introduced into plasma treatment unit in the form of liquid water, a spray of water, which may have a temperature of 100° C. or less, or as vapour having a temperature of 100° C. or more. In use, the heat in the interior of the gasification unit and/or plasma treatment unit ensures that any liquid water, which may be in the form of airborne droplets, is vaporised to steam.

Preferably, the ratio of oxygen to steam is from 10:1 to 2:5, by weight. Preferably, the plasma treatment of the waste is carried out at a temperature of from 1100 to 1700° C., preferably from 1100 to 1600° C., more preferably from 1200 to 1500° C.

The plasma unit in operation will generally contain a melt phase. The temperature of the melt phase in the plasma unit will preferably be 1150° C. or more, preferably of from 1150° C. to 1600° C.

Preferably, the amount of oxygen introduced to the plasma unit for every 1000 kg of waste initially introduced into the gasification unit is from 15 to 100 kg, preferably from 25 to 80 kg. Preferably, the amount of steam introduced to the plasma unit for every 1000 kg of waste initially introduced into the gasifier is from 0 to 50 kg, preferably 0 to 30 kg.

For the waste material having the composition given in Table 1 (containing either 12% or 25% water), the addition rate of oxygen and steam to the plasma converter will preferably be in the range as indicated in Table 3 below.

TABLE 3

Typical relative addition amounts of oxygen and steam oxidants to the plasma converter unit

| | RDF 12% moisture* | RDF 25% moisture* |
|---|---|---|
| Relative oxygen addition amount (kg per 1000 kg waste) | 25-80 | 25-80 |
| Relative steam addition amount (kg per 1000 kg waste) | 0-30 | 0-30 |

*Based on composition of waste feed (the refuse derived fuel) given in table 1

Preferably, the plasma treatment of the waste is carried out in the presence of a plasma stabilizing gas. Preferably, the plasma stabilizing gas is selected from one or more of nitrogen, argon, hydrogen, carbon monoxide, carbon dioxide and steam.

Preferably, water, which will be converted into steam, is introduced into the plasma treatment unit in the form of a spray of water having a temperature below 100° C. There are two main advantages of doing so: firstly, the water in the spray has the effect of cooling the syngas produced in the plasma unit due to promotion of the endothermic reaction of water with carbon (to produce hydrogen and carbon monoxide). Secondly, the overall chemical enthalpy of the produced syngas is increased, allowing a greater export of electrical power if the gas is used to generate electricity. (ie giving an improvement in the overall net electrical conversion efficiency).

The plasma treatment step will provide a secure disposal route for residues produced by the process such a Flue gas cleaning residues.

The waste may contain constituents which contain hazardous compounds and elements, such as heavy metals, which are environmentally detrimental if airborne. These may be termed APC (Air Pollution Control) residues and may be present in the waste to be treated in an amount of ~0.2% by weight. As these residues may be contaminated with heavy metals such as lead, zinc and cadmium, they will be classified as hazardous. Preferably, the process of the present invention further comprises inclusion of hazardous inorganic materials, such as heavy metals and compounds containing heavy metals, into the slag phase of the plasma. This will trap the hazardous materials in an inert non-leachable slag as an inert waste, thus providing a long-term solution for the disposal problem for these materials.

The process may further comprise addition of one or more fluxing agents such as lime, alumina or silica sand to the plasma unit before or during plasma treatment of the offgas and char. The advantage of adding a fluxing agent is that in certain situations, it would ensure that a low melting point, low viscosity slag was produced from the inorganic, non-combustible materials. A fluxing agent such as silica sand, alumina or lime may also be used to immobilize heavy metal species. These fluxing agents are preferably added to the char prior to introduction of the char to the plasma unit, and if the process is a continuous process, the additions may be made to the char stream.

The throughput and chemistry of the gas and char reactants entering the plasma unit are preferably maintained under steady state conditions. This should be achievable by the close control of the feed preparation system and primary gasifier upstream of the plasma unit.

The type, proportion and total addition rates of oxidant to the plasma unit will be closely controlled and will take account of a number of factors:
- the throughput and chemistry of both the char and gas reactants;
- the knowledge that the addition of steam as an oxidant is effective in ensuring rapid reaction rates with the pyrolysed solid char and soot products in the gas phase. It can help control the thermal stability of the plasma unit, avoiding the possibility of thermal "runaway";
- the addition of oxygen generates heat as a result of the exothermic (partial) combustion reactions that occur;
- it is likely that steam will be used in combination with oxygen or oxygen enriched air for reasons of economy, efficacy of gasification of the char, destruction efficiency of the organics, quality and calorific value of the gas product and overall controllability of the process;
- air may be used either in combination or as an alternative to oxygen. Although air is inexpensive to use, it is thermally less efficient than oxygen, produces a much lower calorific gas product (due to the dilution effect of nitrogen) and may generate NOx as a by-product; and
- the overall process economics, (which will be sensitive to local factors).

If the chemical composition and mass throughput of the reactants are generally constant, then the ratio of oxidant to the reactant streams (containing the waste) will also preferably be maintained at a constant value. An increase in the feed rate of the reactants will preferably lead to a proportionate increase in the oxidant addition rate, which may be controlled by automatic oxidant addition means. The electrical power supplied to the plasma will also preferably be adjusted to match the change in the feed rate of the waste to the plasma unit and will take account of the thermo-chemistry of the system and the thermal losses from the unit.

The gas exiting the plasma unit may be maintained at a temperature greater than 1000° C., preferably between 1000° C. and 1500° C. most preferably between 1000° C. and 1300° C. Excessive off-gas temperatures (ie >1300° C.) are not desirable as this increases the plasma power heating requirement, reducing the net export of electricity from the plant.

Preferably, the gas produced from the gas plasma treatment is used in a turbine or gas engine to generate electricity. The turbine may be a conventional boiler steam turbine or gas turbine. The syngas resulting from the plasma treatment process is preferably cooled or allowed to cool to a temperature to below 200° C. prior to use in a turbine. This allows the partially combusted components of the gas, e.g. carbon monoxide, to be combusted completely and efficiently. Additionally, if the syngas from the plasma treatment is cooled using a heat exchange system which transfers the heat to another (heat transfer) gas, preferably the heat transfer gas is used to heat a steam turbine for additional power generation.

The plasma unit preferably comprises a stainless or carbon steel welded shell lined with high grade refractory lined bricks.

Preferably, the plasma unit comprises remote water cooled copper elements, which will preferably be employed to effectively contain the molten inorganic phase(s). These elements preferably act to form a protective frozen melt layer on the hot face refractories to promote good refractory performance.

Preferably, the gasifier comprises an exhaust gas port in fluid connection with the plasma unit. Preferably, the exhaust gas port in the gasifier will be closely coupled to the plasma unit to prevent condensation of tar or volatile salts in the channel connecting the two units.

Preferably, the plasma unit comprises either a single or twin graphite electrode system to generate the plasma arc. Three possible configurations and the method by which they are interconnected to the plasma power supply are shown in FIG. 1. Each of diagrams (a) to (c) shows a schematic drawing of a furnace having two electrodes. The 'molten bath' refers to the molten slag present at the bottom of the furnace.

In diagram (a), an electrode is located in the roof of the furnace and another electrode is located at the base of the furnace. Both electrodes are connected to a power source to enable generation of plasma within the furnace.

In diagram (b), the same configuration as in diagram (a) is shown, with an additional start electrode (shown to the left of the furnace) to enable ease of start-up of the plasma generation system, as would be appreciated by the skilled person.

In diagram (c), two connected electrodes are located in the roof of the plasma unit.

Preferably, one or more electrode(s) will be located in the roof of the plasma unit. The plasma unit may preferably comprise water cooled electrode seals at the inlets and outlets of the unit.

Preferably, the graphite electrode(s) will be drilled, and a plasma stabilizing gas (eg nitrogen or argon) will be injected down the centre of the electrode(s).

Optionally, the electrodes are coated with a refractory material (eg alumina coating) in order to reduce the wear of the electrode.

Optionally one or more water-cooled plasma torches may be used to generate the plasma.

The plasma unit may comprise one or more feed ports for the introduction of the char residue from the gasification process. Preferably, the char residue is introduced into the plasma unit via one or more feed ports in the roof of the unit. The feed ports will preferably be located remotely from the slag removal spout.

The plasma unit may comprise one or more gas entry feed ports for the introduction of the offgas into the plasma unit; the feed ports may be located in a sidewall or the roof of the plasma unit. The tar-laden gas (the offgas) from the gasifier will preferably enter the plasma unit either through a port in the sidewall or roof. Preferably, the plasma unit will be designed to prevent or minimise short circuiting of the dirty gas, for example:
- preferably, the point of exit for the reformed gas (the syngas) will be diametrically opposed and as remote as practical to the point of entry of the gases and/or
- the offgas will preferably be forced downwards in the plasma unit (eg either by flow direction devices or else by locating the exhaust port at a lower level than the gas entry point thereby reducing the buoyancy effect of the gases.)

The plasma unit will be designed to ensure adequate residence time for both the char and gas reformation reactions to occur.

The oxidant may be injected into the plasma unit to enable the gasification of the carbon component of the char and reformation of the dirty, tar-laden gas stream (the offgas) from the gasifier unit.

The oxidant injection point will preferably be remote from the electrodes to prevent high graphite wear rates.

The plasma unit may comprise separate and multiple points of injection for the oxidant, ideally at least one for injection point for the offgas and at least one injection point for the char residue. Alternatively, the char and offgas may be introduced through a single point of injection.

An injection means may be provided in the plasma unit for the injection of the oxidant and the injection means is preferably such that when injected a radial flow of oxidant will result. This would improve the contacting between the oxidant and reacting "fuel" phases (i.e. the offgas and the char).

The char may contain an inorganic fraction, i.e. solid components containing elements other than carbon. The inorganic fraction of the char will form a molten complex oxide "slag" phase that, preferably, will be continuously removed from the plasma unit. The unit may therefore comprise a means for removing the slag phase, which may be in the form of a slag overflow spout angled upward (toward the exterior of the unit), so the molten slag exiting the plasma unit will create an airlock to prevent either air ingress or gas egress from the unit.

During use, the plasma unit will preferably be tightly sealed. The unit will preferably be maintained under positive pressure.

Preferably, a gas tight, bolted flange will be used to seal the roof to the main furnace body section. Preferably, the flanged bolts will be spring-loaded to ensure that in the unlikely event of high overpressure in the plasma unit, (eg as a result of an explosion) the roof will be raised to allow rapid dissipation of pressure. The escaping gases will be safely handled via a fugitive emissions handling system.

The presence of carbon soot or other conductive deposits in the unit may encourage the generation of side-arcs (also referred to as parasitic arcs) which emanate from the electrode(s) and transfer to the roof or the sidewalls of the unit rather than to the melt. Side-arcs tend to be destructive, leading to premature failure of the reactor shell. A number of measures may be in place to prevent side-arc development from occurring:

preferably, the roof of the plasma unit will be constructed in sections which will be electrically isolated from each other.

Close attention will be paid to the design of the electrode seal to avoid the possibility of electrical tracking to the roof. All holding bolts, securing the seal will preferably be electrically isolated and, preferably, dust protected to avoid build-up of dust on electrically conductive surfaces.

Gas purging will preferably be employed around the outside of the electrode(s) to prevent the build-up of deposits on surfaces that are in close proximity to the electrode.

The unit is preferably adapted in a way that will minimize the production of soot or tarry products All seals will be designed to be easy to clean and/or replace if required.

The off-gas composition will preferably be continuously monitored and a feed back control loop may be employed to adjust the power and oxidant feed rate to the plasma unit.

The reformed gas (syngas), which results from the plasma treatment, will preferably be further cleaned to remove acid gases, particulates and heavy metals from the gas stream to produce a fuel that can be use in the generation of electricity and heat for steam raising.

Optionally, the apparatus may further comprise a pyrolysing unit.

The process may further comprise collecting the gas produced in the plasma treatment unit (commonly called a syngas).

Typically, the plasma treatment unit will generate a solid and/or molten material, as would be know to the skilled person. The process may further comprise collecting the solid and/or molten material produced in the plasma treatment unit.

The apparatus may further comprise a unit for the aerobic microbial digestion of waste which may be as described herein.

As mentioned above, the process preferably further comprises subjecting the waste to microbial digestion, more preferably aerobic microbial digestion, prior to the gasification step. This has the added advantages of producing a more homogenous feedstock with a higher calorific content and less moisture content than unprocessed waste, which allows for a much more efficient combined gasification and plasma process. The gasification process is far more efficient with a feedstock of relatively consistent calorific value. Likewise, it has been found that an efficient plasma treatment should ideally have a relatively homogenous feed of offgas. By treating the waste initially with a microbial treatment to homogenise the waste introduced to the gasifier, the resultant offgas from the gasifier is also more consistent in calorific value and hence the process as a whole is more efficient.

Preferably, the aerobic microbial digestion is carried out in a rotary aerobic digestion unit.

Preferably, the waste is rotated in the rotary aerobic digestion unit at a rate of from one revolution every minute to one revolution every ten minutes.

The moisture content of the waste prior to aerobic digestion may be from 20 to 75% by weight, preferably 25 to 50% by weight.

Preferably, the waste has an average moisture level of 45% or less, preferably 30% or less, after the aerobic digestion treatment.

The microbial digestion step preferably comprises the steps of:

mixing a (first) supply of waste having a first average moisture level before treatment with a supply of other waste, having a lower average moisture level before treatment, wherein the relative quantities by weight of the first waste and the other waste are controlled, feeding the mixed waste into a microbial treatment vessel, treating the waste by microbial activity in the treatment vessel, the mixed waste being agitated during treatment, the oxygen content in the gas in contact with the mixed waste being controlled during the treatment process so that it does not fall below 5% by volume, the mixed waste having an average moisture level after treatment not exceeding 45% by weight, more preferably not exceeding 35% of weight and most preferably not exceeding 25%.

Subsequent drying of the product to an average moisture content of below 20% by weight can be carried out relatively easily. Preferably, the first supply of waste comprises organic waste, preferably solid organic waste. The other waste may comprise solid waste.

The part of the apparatus of the present invention for carrying out the microbial digestion preferably comprises:

a supply for a first waste having a first average moisture level before treatment and a supply for other waste having a lower average moisture level before treatment, means for mixing the first waste and the other waste, control means for controlling the relative quantities by weight of the first waste and other waste mixed together, means for feeding the first waste and the other waste to a treatment vessel, means for agitating the solid organic waste in the treatment vessel, drying means following the treatment vessel and means for controlling the air flow through the treatment vessel, and/or the input of first waste and other solid waste to the treatment vessel, so that the average moisture level of waste after treatment does not exceed 45% by weight, more preferably not exceeding 35% by weight and most preferably not exceeding 35% by weight, and so that the oxygen content of gas in contact with the mixed waste in the vessel does not fall below 5% by volume.

Variations in the physical composition (for example calorific content) and moisture level of the first waste (typically domestic waste, but also possibly agricultural waste) can be 'smoothed out', so that a product formed from treated waste from different areas or different time periods can be relatively homogeneous.

The waste, either the first and/or the other waste, treated using the microbial step is preferably "organic waste", preferably solid organic waste, for example domestic waste, industrial waste or agricultural waste. "Organic waste" is waste that has at least a proportion of organic material capable of being treated microbially. The other waste mixed with the first waste preferably also contains organic material.

By, "mixing" it is meant that at least two separate sources of waste are collected and fed into the microbial treatment vessel in controlled relative quantities by weight. The waste from the two different sources may be mixed in a mixing device or in a shredder or they may be mixed during agitation in the treatment vessel.

The microbial digestion step will preferably produce heat. This breakdown is accelerated by changes in the physical nature of the waste. Typically, the microbial activity is bacterial activity. Preferably, the microbial activity is aerobic.

The microbial digestion process is preferably carried out using bacteria in the thermophilic phase, which normally occurs in the temperature range 60° C.-75° C., most preferably around 63° C.-70° C. In this phase, very rapid digestion occurs with the production of heat. It is found that the reaction in the thermophilic phase is much quicker than the commonly used mesophilic phase which occurs in the range 30° C.-38° C.

Accordingly, accelerated decomposition of the waste takes place. However, if the temperature rises above 75° C., there is a danger that the bacteria will be destroyed.

The microbial reaction in the thermophilic phase results in the natural generation of heat which breaks down the waste to produce a material which is suitable for processing to provide a fuel or compost. The microbial reaction will almost always provide sufficient heat to maintain itself without provision of supplementary heat. However, in practice, chemical mixing of the waste can lead to an increase in temperature which assists the commencement of the microbial activity.

Other material may be added to the microbial treatment vessel, for example quicklime, to control pH.

Preferably the oxygen level in the gas which is in contact with the waste being treated in the microbial digestion step does not fall below 5% by volume.

The treatment vessel for carrying out the microbial digestion is not normally filled completely, so there is a gas space above the waste being treated. The oxygen content in this gas space is suitably measured and preferably controlled. The skilled person will be aware of suitable techniques for measuring and controlling oxygen content. The moisture level may also be measured, as described below.

Preferably, the oxygen content (and, optionally moisture level) of gas removed from the treatment vessel (as will be described further below) is measured. This is a particularly convenient arrangement.

The gas in the microbial treatment vessel will typically comprise atmospheric nitrogen, oxygen, carbon dioxide and water vapour. This gas may contain no methane, ammonia or hydrogen sulphide, as the microbial activity is carried out in the thermophilic phase.

In order to maintain the oxygen level above 5% by volume, air or oxygen can be supplied to the treatment vessel. Air or oxygen can be supplied continuously throughout at least part of the process or in discrete inputs of air/oxygen.

In order to replace the oxygen which promotes aerobic digestion and to control moisture level in the exit gas, (the gas exiting the microbial treatment vessel) a relatively high airflow rate is required.

The air can be supplied by some form of forced draught. For example, a fan may be provided. The fan may blow air into the microbial treatment vessel. However, it is preferred that there is a fan to draw gas out of the microbial treatment vessel. Where extraction means are provided for withdrawing gas from the microbial treatment vessel, it may be replaced by air supplied through at least one duct. Air can be supplied to the microbial treatment vessel intermittently, but it is preferably supplied substantially continuously. The microbial treatment vessel may not be substantially sealed, so that as long as gas is removed, air will naturally flow in through openings to replace the gas removed.

As fresh air is supplied to the microbial treatment vessel and as gas is removed from this vessel, water vapour will be removed from the waste. This helps to control the drying effect, leading to a product having an average moisture level within the desired range.

Air supplied to the microbial treatment vessel may be previously dried by any suitable apparatus, to maximise the drying effect.

According to a preferred aspect of the invention, the moisture level in the gas in contact with the waste in the microbial treatment vessel is maintained at a level below its dew point. This ensures that water is substantially continuously removed from the waste being treated into the gas space by evaporation.

Means may be provided in the microbial treatment vessel for monitoring the moisture level in the gas space. Any suitable means may be employed for measuring the moisture level.

The moisture level in the microbial treatment vessel may be maintained below the dew point by supplying air which has a moisture level below the dew point of the waste being treated at the temperature of treatment. As the temperature of the microbial digestion will be typically higher than ambient temperature, normal fresh air may be used. Alternatively, dried air, having a moisture level below the moisture level of ambient air, may be used. The main process features which maintain the oxygen level within the required range can also be used to maintain the moisture level within the required range.

The flow of air and gas through the microbial treatment vessel also removes heat from this part of the apparatus. It is found that an adequate heat balance can be achieved. That is, heat generation by the microbial activity within the concentrated mass of waste can be balanced with heat removal by the gas flowing through the vessel so that the temperature is maintained at a desirable level.

Preferably, the waste should be agitated during the microbial digestion. This provides further breakdown of the waste and mixing to ensure that microbes are spread throughout the material. It also exposes-different parts of the waste to the gas to ensure access of oxygen to the waste and drying of the waste by the gas. Agitation may take place by any suitable means, but it is particularly preferred that the digestion takes place in a rotary aerobic digestion unit, i.e. a unit containing a rotating aerobic drum.

The drum may be rotated at any suitable rate, and suitably completes one revolution in a time range of 1 minute to 10 minutes, preferably 2-5 minutes, most preferably about 3 minutes. However, a higher rate of rotation may be used during loading and unloading of waste into/out of the microbial digestion unit, in order to assist these operations. Typically, the speed can be increased to one revolution per minute during loading and unloading.

As will be described further below, the drum is suitably simultaneously loaded with waste at one end and unloaded with microbially treated waste at its other end. Loading and unloading typically take place at 4 hourly intervals and can take 30 minutes.

The drum preferably comprises a substantially parallel sided circular section cylinder. The axis of the cylinder may be inclined to the horizontal, for example at an angle in the range 30-10° most preferably 5°-8°, to provide gravitational flow through the drum.

Any suitable size of drum may be provided, depending upon the rate of consumption of waste. It has been found that, for a processing rate of about 250-500 tonnes per day, a drum of diameter in the range 3.5-6 m, preferably 4-6 m most preferably around 5.5 m should be used. The length should be in the range from 6 to 10 times the diameter, most preferably about 8 times the diameter, suitably up to 40 m.

The drum may be used of any suitable material, for example mild steel.

A rotary drum has the advantage that it is mechanically simple. There are relatively few problems of blocking and very few moving parts, which reduces the risk of breakdown.

The agitation caused by the rotation leads to attrition of the waste, further contributing to its breakdown. Preferably, the drum is filled to a high level with waste, being preferably initially 75% to 90% full by volume. This leads to increased attrition, rapid heat generation and also to efficient use of microbial treatment vessel.

Average residence time of the waste in the microbial treatment vessel is suitably in the range 18-60 hours, more preferably around 24 to 48 hours, most preferably around 36 hours.

The microbial treatment vessel preferably comprises a vessel through which the waste is moved during treatment, for example a drum as described above. The waste suitably moves from a loading point to an unloading point within the drum. As noted above, loading and unloading suitably occur substantially simultaneously, with fresh (microbially untreated) waste being loaded at the loading end and mixed solid treated waste being removed at the unloading end. The loading and/or unloading operation can take 10-40 minutes, preferably about 30 minutes.

One unloading operation or loading operation is preferably spaced from the following unloading or loading operation respectively by a period in the range 2-8 hours, preferably 3-5 hours, most preferably around 4 hours. In this way, a "semi batch" process can be carried out.

During processing, it is found that the volume of the material may decrease by as much as 25%. The gas space over the material will accordingly increase.

The waste material should be discharged from the treatment vessel at a stage at which the treated waste material is sufficiently digested and sufficiently dry. This typically occurs after a period of about 48 hours. By restricting residence time to 48 hours or less, additional loss of carbon can be reduced.

It has been found that microbial treatment is effective in reducing the size of some constituents of the waste. Nevertheless, further processes to assist size-reduction of the waste constituents may be used. For instance, in order to promote the microbial activity, some parameters of the waste fed to the digestion step are preferably controlled. For example, the waste is preferably treated in a first process before the digestion step (or the gasification step, if the process does not include a microbial treatment step) to remove particles of size in excess of 100 mm, preferably 60 mm, more preferably 50 mm. This first process may comprise a first step in which very large objects are removed, for example by hand or by sieving and a second step in which the remaining material is treated to reduce its particle size, for example by shredding. The person skilled in the art will be able to obtain suitable shredding apparatus. Shredders can either have one fixed rotor or two counter-rotating rotors.

Alternatively, (prior to the microbial or gasification step), the waste may be subjected to an operation to reduce its particle size, for example by shredding without initially removing oversized particles. The shredding operation is particularly beneficial for the microbial treatment process, as it mixes the material thoroughly, spreading the microbial culture throughout the material and initiates a thermophilic reaction very quickly. Shredding may be used to reduce the spacing between the particles to promote the microbial reaction.

The second parameter which may be controlled is the average moisture content of at least some of the waste treated in the microbial treatment step. The average moisture level of this part of the waste is suitably in the range 20-75%, more preferably 30 to 60%, most preferably 30 to 50%.

All moisture levels quoted herein are % by weight. They are average values, being averaged for quantities of at least 100 kg of waste.

Moisture levels of waste may be measured by measuring the moisture level of air or gas over the waste at a fixed temperature and in equilibrium with it.

If the waste after mixing is low in organic content or moisture level, process water maybe preferably added in controlled quantities. This process water is preferably waste water from water treatment, most preferably dewatered sewage sludge. This material has a high nitrogen content and acts as a catalyst for the microbial reaction.

As mentioned above, a desirable moisture level of the waste treated in the microbial treatment step may be obtained by blending a first waste with other waste of a lower average moisture level. It is found that mixed domestic waste typically has a moisture level in excess of 30% by weight. Commercial waste from offices and factories is typically drier, having a moisture level in the range 10%-30% by weight.

The moisture level of waste fed to the digester may be manipulated by altering the mixing ratios of different types of waste. Preferably at least part of the waste fed to the microbial digester has a moisture level in the range 20-75% by weight, preferably 25 to 65% by weight in order to promote the faster thermophilic reaction. However, part of the waste fed to the digester may comprise a relatively dry commercial waste. The heat generated by the digestion of the moist waste is sufficient to treat the whole of the waste fed to the treatment vessel. However, during the agitation process, the commercial and domestic waste are slowly mixed together reducing the overall moisture content of the mixture, so that at the end of the processing, the moisture level does not exceed 45% by weight and preferably does not exceed 25% by weight.

The first waste with higher moisture level may be blended with other waste with lower moisture level in blending apparatus in a controlled manner. The relative quantities of different types of waste are controlled so that the desired average moisture level over the combined masses of mixed wastes is obtained as explained above.

The blending step also allows absorbent material such as paper and paper based material (which is particularly common in commercial waste) to be blended intimately with the moist waste (such as domestic waste). The absorbent material absorbs liquid rich in bacteria, providing a substrate for the bacteria to grow on and allowing the bacteria to be spread throughout the waste being processed. This promotes reaction and mixing, leading to an improved digestion. Further, the wetting of the paper helps it to be broken down.

In processing the waste in the microbial treatment step, it is desirable to produce a product which is substantially homogeneous, such that its constituents are particles have a relatively small size distribution, the particles have a largest measurement of 50 mm or below. The blending step helps to improve the homogeneity of the product.

However, although blending takes place, it is found that the moisture level remains concentrated in local areas of the waste, where it is sufficiently high to allow the thermophilic reaction to commence and proceed very rapidly.

The relative quantities of different types of waste feed can be controlled using automatic weigh feeders.

By way of example, the moisture level of the waste during the microbial treatment may be as follows:

Domestic waste with a high organic content and moisture level above 50% can be mixed with commercial waste having a moisture level of 20% or below in a suitable ratio to provides a blend having an average moisture level in the range 45 to 55% by weight.

During microbial digestion, a part of the moisture is absorbed by the gas and air flowing over the material being processed. The average moisture level may drop to around 30-40% by weight, preferably 25 to 30% by weight.

During emptying of the microbial treatment vessel, the waste which still has a high residual heat level, may be dried by a forced draught as described above, so that the moisture level drops to the range 30-40% by weight, preferably 25 to 30% by weight.

The waste treated in the microbial digestion step may then be further dried on a drying floor as described above, so that the moisture level drops to below 25% by weight.

A further parameter which may be manipulated is the pH of the waste in the microbial treatment process. This pH of the waste in the microbial treatment process is preferably of from 6.0 to 8.5, preferably 6.3 to 7.3, most preferably around 6.8.

Nitrogen level has an impact on microbial activity, and adjustment of pH and nitrogen content can be advantageous.

It has been further found that the density of the waste fed to the microbial treatment vessel is suitably not too low. Preferably, the density is not less than 450 g per liter, preferably not less than 750 g per liter. Again, the blending step is particularly useful here. Domestic waste can have a relatively high density. The average density can be controlled by admixing a suitable quantity of commercial waste, which has a comparatively low density.

Preliminary Treatment

As described above, the waste may be subjected to various types of treatment before the gasification or microbial digestion step ('previous steps'). Preferably, the previous steps include any or all of the following:

1. Picking

Initial treatment to remove objects which are not readily combustible, such as stone, concrete, metal, old tyres etc. Objects having a size in excess of 100 mm or more may also be removed. The process can be carried out on a stationary surface, such as a picking floor. Alternatively or additionally, the waste may be loaded onto a moving surface such as a conveyor and passed through a picking station in which mechanical or manual picking of the material takes place.

2. Shredding

Shredding is a highly preferred step. It is carried out to reduce the average particle size. It can also be used to increase blending of waste from different sources. It also makes the treatment process more effective. It is found that, during the shredding process, microbial activity may commence and rapidly raise the temperature passing very quickly through the mesophilic phase into the thermophilic phase.

3. Screening

The waste may be mechanically screened to select particles with size in a given range. The given range may be from 10 mm to 50 mm. Material less than 10 mm in size comprises dust, dirt and stones and is rejected. The waste may be treated to at least two screening processes in succession, each removing progressively smaller fractions of particles. Material removed in the screening process as being too large may be shredded to reduce its average size. Material which is classified by the screen as being of acceptable size and, where applicable, shredded material can then be fed to the treatment vessel.

Subsequent Treatment

The waste may be subjected to a number of steps after the microbial digestion treatment step and before the gasification step. These steps may include any of the following:

1. Grading

The material may be screened to remove particles in excess of a given size. For example, particles in excess of 50 mm may be rejected. They may be subsequently shredded to reduce their size, returned to the aerobic digester or simply rejected.

2. Metal Separation

Relatively small metal particles such as iron or aluminium may have passed through the system. They can be removed, for example by a magnetic or electromagnetic remover in a subsequent step. Metal particles removed from the system may then pass to a suitable recycling process.

3. Drying

Suitably, after treatment in the microbial treatment vessel, the waste is subjected to an additional drying step. If the moisture level does not exceed 45% by weight, more preferably does not exceed 35% by weight and most preferably does not exceed 25% by weight, after the microbial treatment, the subsequent drying can be carried out relatively simply. For example, in a first drying stage, a forced draught of air may be provided during or after the unloading phase from the treatment vessel. During this stage, the waste treated by the microbial digestion stage will still be at high temperature (for example in the range 50-60° C.) and further moisture can be removed simply by forcing air over it. A further drying step may comprise laying the material out on a drying floor. In this step, waste is laid out at a thickness of not more than 20 cm over a relatively large area for a suitable period of time, during which the moisture level drops. The waste may be agitated, for example by turning using mechanical or manual apparatus such as a power shovel. The waste may be turned at intervals of for example of 2-4 hours preferably around 3 hours. Preferably, during this stage, the moisture level drops to below 25% by weight after which no further biological decomposition occurs. Suitably, the waste is left on a drying floor for a period in the range 18-48 hours, preferably 24-36 hours, more preferably around 24 hours. It is also found that further drying may take place during subsequent processing, due to the mechanical input of energy. Waste heat from other process equipment, for example from the gasification and/or the plasma treatment step, may be used to dry the material. Air warmed by the heat generated in the gasification and/or plasma treatment steps may be blown into the microbial waste treatment vessel and over or through the waste to increase the drying rate of these processes.

Alternatively, the drying apparatus may comprise a rotary flash drier or other drying device.

4. Pelletising

In order to convert the treated waste to fuel, the waste may be classified according to size and subsequently densified to provide pellets of suitable size for use in the gasification step. During this pelletisation stage, further drying of the waste may occur, due to heat generation caused by friction and due to further exposure to air. Preferably, in order for pelletising to proceed well, the moisture level of the treated material is in the range 10-25% by weight.

It has been found that the microbial treatment step can be adapted to provide a fuel for use in the gasification step, referred to as Green Coal, which has a calorific value in the order of 14.5 MJ/kg which is about half that of industrial coal.

By blending different sources of waste material, fuel produced by the microbial treatment step at different times or with waste from different locations can be relatively homogeneous in terms of:

1. Calorific value—suitably in the range 13 to 16.5 MJ/kg, preferably 12-15 MJ/kg. The calorific value may be higher if the contents have been significantly dried.

2. Density—suitably in the range 270-350 kg/m$^3$ more preferably around 300 kg/m$^3$.

3. Moisture level—below 30% by weight and preferably around 20% by weight.

The process of the present invention may comprise a pyrolysis step prior to the gasification step, and after the microbial digestion step, if used. The waste that results from the microbial digestion step may be used to supply a feed to a pyrolysis process, as described below.

The apparatus of the present invention may include means for feeding microbially treated waste from the treatment vessel to a means for pyrolysing the treated waste (i.e. a pyrolysis unit).

If the process involves a pyrolysis step prior to the gasification step, preferably the pyrolysed waste is fed to the gasification unit, where the gasification takes place. This will normally require the pyrolysed material to be at a high temperature and the gasification process preferably occurs directly after the pyrolysis process.

The apparatus may comprises a microbial digestion unit in fluid connection with the gasification unit, and the gasification unit may be in fluid connection with the plasma treatment unit, to allow waste treated from the microbial treatment to be transported to the gasification unit, and to allow offgas and char resulting from the gasification step to be transported to the plasma treatment unit.

The apparatus may be adapted to treat the waste in a continuous process. Microbial digestion step may be typically be carried out in a semi batch-wise fashion, whereas the pyrolysis and gasification processes typically require a continuous feed of material, an interim storage means, for example in the form of a feed hopper may be provided. It is preferred that there is a first delivery means for receiving treated waste from the microbial treatment process and feeding it into the interim storage means and a second feed apparatus for feeding the stored treated waste from the interim storage means to the pyrolysis apparatus or the gasification apparatus. The second feed means is preferably operated substantially continuously. The first and second feed apparatus may comprise any suitable means, for example conveyor belts or screw feeders.

Figure 2:
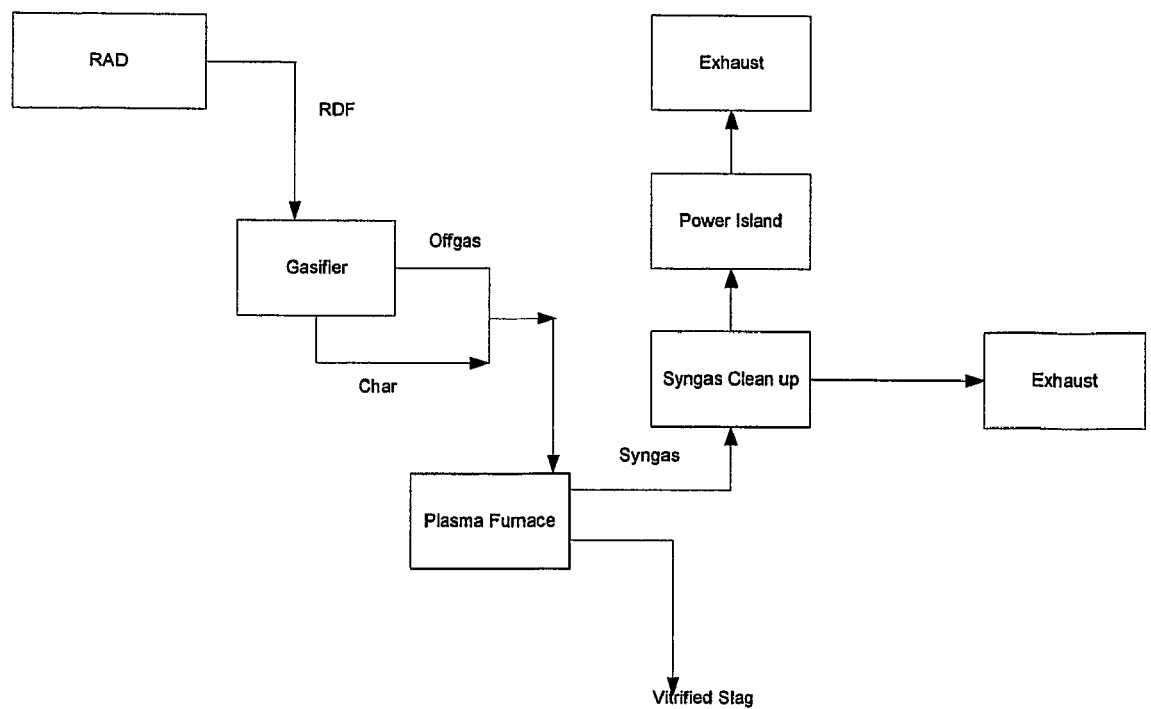
FIG. 2 shows a preferred embodiment of the process of the present invention.

A preferred embodiment of the process of the present invention is illustrated in FIG. 2, which shows:

a first step in which the raw waste is subjected to aerobic microbial digestion in a rotary aerobic digestion unit (RAD), a second step comprising gasifying the products of the rotary digestion step in a gasifying unit (gasifier), which produces an offgas and a char, a third step comprising treating the char and the offgas to a plasma treatment process in a plasma unit (plasma furnace), producing a vitrified solid slag (which is discarded) and a syn gas, a fourth step comprising cleaning the syngas, a fifth step comprising either exhausting the syngas or combusting the syngas in a gas engine or gas turbine (termed a 'power island' in the Figure) to produce electrical energy, and then exhausting the combusted syngas. The heat produced in combusting the syngas or in the plasma step may be used to dry waste material (not shown).

Figure 5:
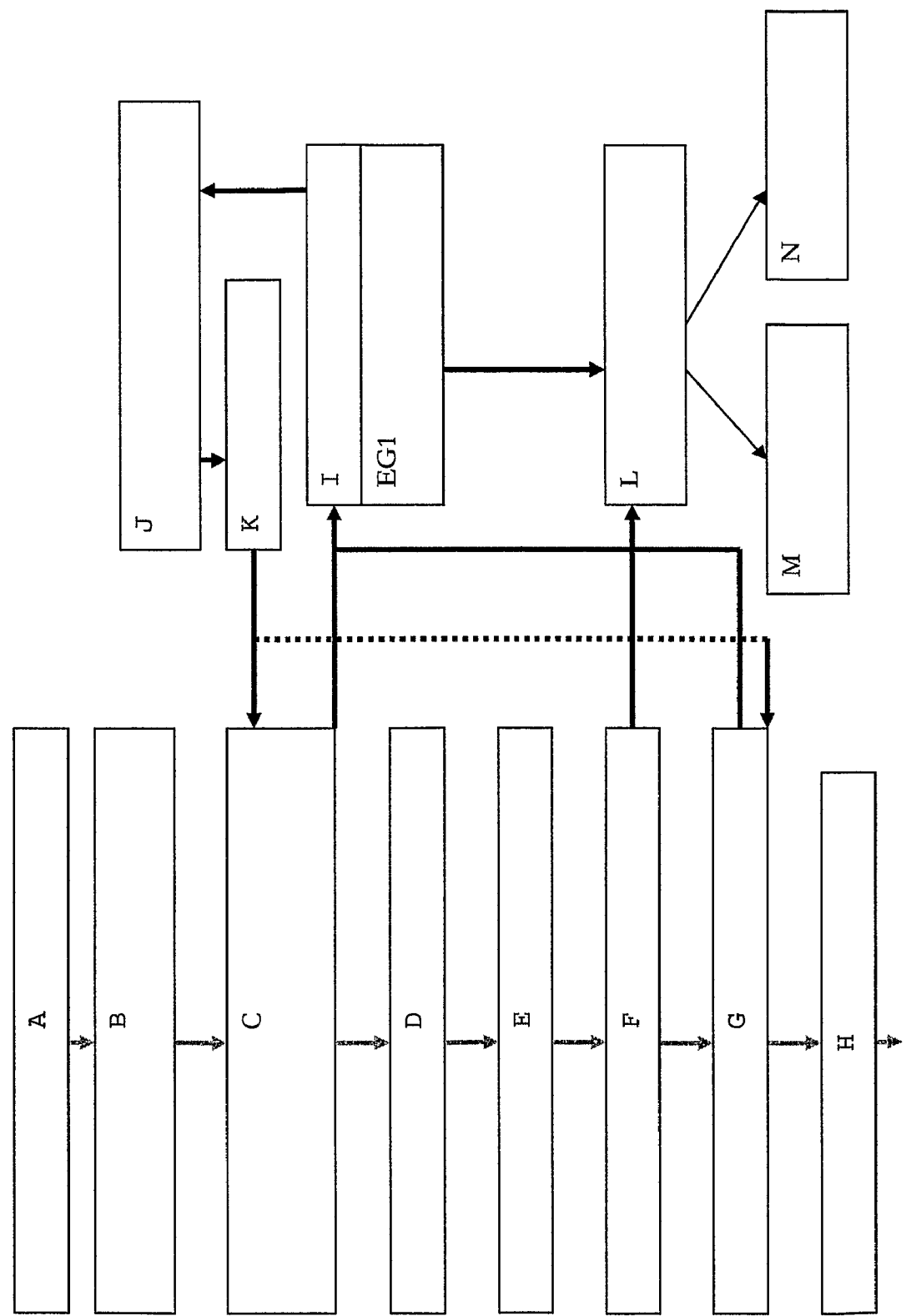
FIG. 5 shows a further preferred embodiment of the process of the present invention.

A further preferred embodiment of the process of the present invention is illustrated in FIG. 5, which shows:

Step A, in which the raw waste is subjected to aerobic microbial digestion in a rotary aerobic digestion unit (RAD), Step B, in which the waste feedstock resulting from Step A is treated in a gasifier, to produce an offgas and a char, both of which are then treated in a plasma unit at 1500° C., Step C, in which the hot gases produced in Steps B and/or I are cooled in a gas cooling system, Step D, which comprises optionally treating the gas to a cleaning step, Step E, which comprises optionally compressing and storing the gas, Step F, in which the gas from step E is passed through a gas turbine, which is directly coupled to a generator (EG2—not shown) to generate electricity, Step G, in which the gas is passed through a heat recovery steam generator, Step H, which involves exhausting the gas to a stack and monitoring the flue gas, Step I, in which high pressure steam from step C and/or G is passed through a steam turbine to generate electricity with electricity generator 1 (EG1). The low pressure steam from the turbine is passed via a close-coupled condenser to a separate cooling tower in Step J and to a feed-water system in step K. The electricity generated in Step I and/or F may be distributed in Step L either to any part of the apparatus (represented by step M) or transferred externally (step N).

As indicated above oxygen and/or steam may be introduced to the gasification unit or pyrolysis unit and/or plasma treatment unit.

The present invention will now be further exemplified in the following non-limited Examples

EXAMPLES

Gasifier Set-Up and Operation

Figure 3:
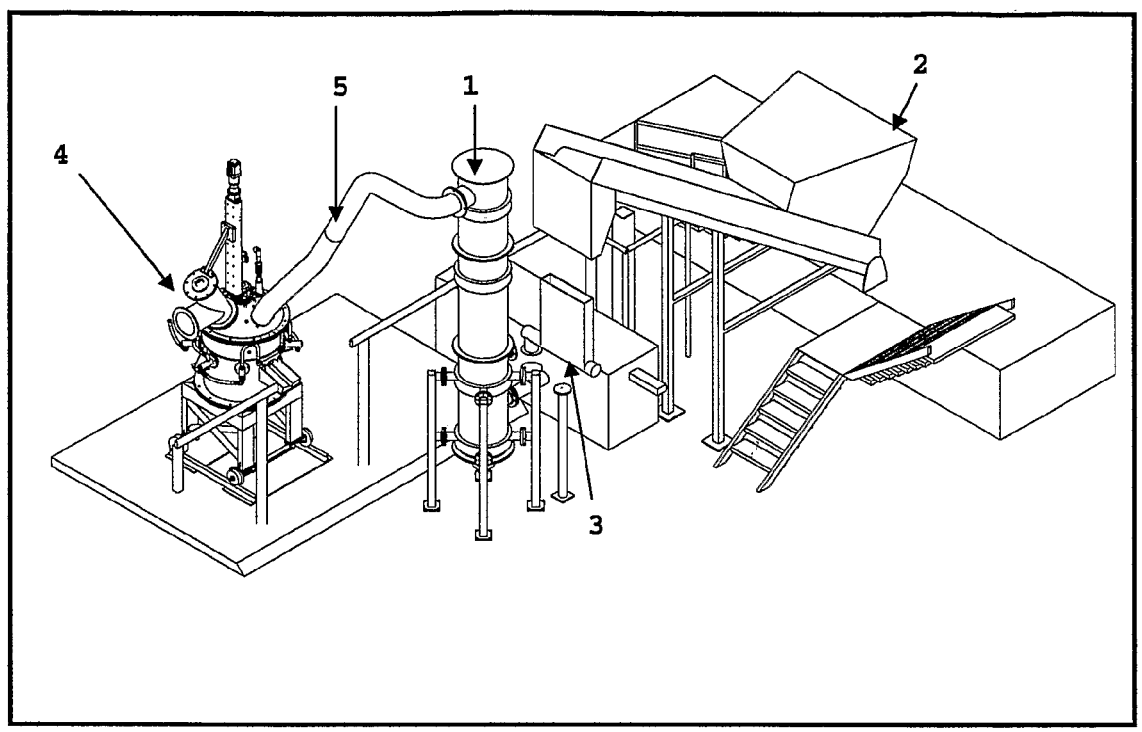
FIG. 3 shows an embodiment of the apparatus of the present invention, including a fluid bed gasifier (1) and a plasma furnace (4).

See FIG. 3

The FBG (fluid bed gasifier), comprises a vertical, cylindrical, mild steel vessel lined with a composite refractory lining. The external dimensions of the gasifier shell are 1.83 m diameter×5.18 m high and the internal diameter is 0.254 m; the height of the expanded bed is approximately 1.0 m.

The FBG uses a heated bed of alumina silicate ceramic particulates as the bed media. RDF (refused derived fuel)

feedstock is fed continuously, at a controlled rate, to the FBG 1 through a solid fuel feeder system. The as-received feed is transferred by a belt conveyor 2 to a surge hopper 3 where a variable-speed screw conveyor controls the volumetric feed rate of the solids. These discharge into an airlock. A constant speed screw conveyor is employed to transfer the feed from the airlock to the fluidised bed 1 where it is charged above the upper surface of the bed. Additional inert gas purging is used at the hopper and at the airlock to prevent air ingress or gas egress into the feed stream.

A propane fuelled under-bed preheating system is used to raise the temperature of the bed to 420° C. At this point wood pellets are fed through a separate feeder into the airlock to raise the temperature of the bed to 600° C. when the secondary propane supply is discontinued, then at 700° C. the primary propane supply is turned off. The wood pellet feed is continued to attain the operating temperature of 800-850° C. when it is replaced by RDF.

Oxygen is supplied from a 'Titan' multi-pack of 10-11 cylinders. The flow rate is controlled through a mass flow controller (MFC) rated up to 500 Nlpm.

The oxidants: oxygen and steam, are mixed prior to injection through an upward facing nozzle located below the bed. The individual steam and oxygen feed rates are closely metered to match the feed rate of the RDF to ensure that the gasifier operates within the design operating limits.

Multiple pressure and temperature sensors are used to closely monitor and control the FBG operation. Safety interlocks are built in to ensure safe shut-down or alarming of the system in the event of the unit falling outside the specified operational limits.

The offgas exiting the FBG is transferred to the plasma converter unit 4 in a refractory lined steel duct 5.

Plasma Converter Set-Up

Figure 4:
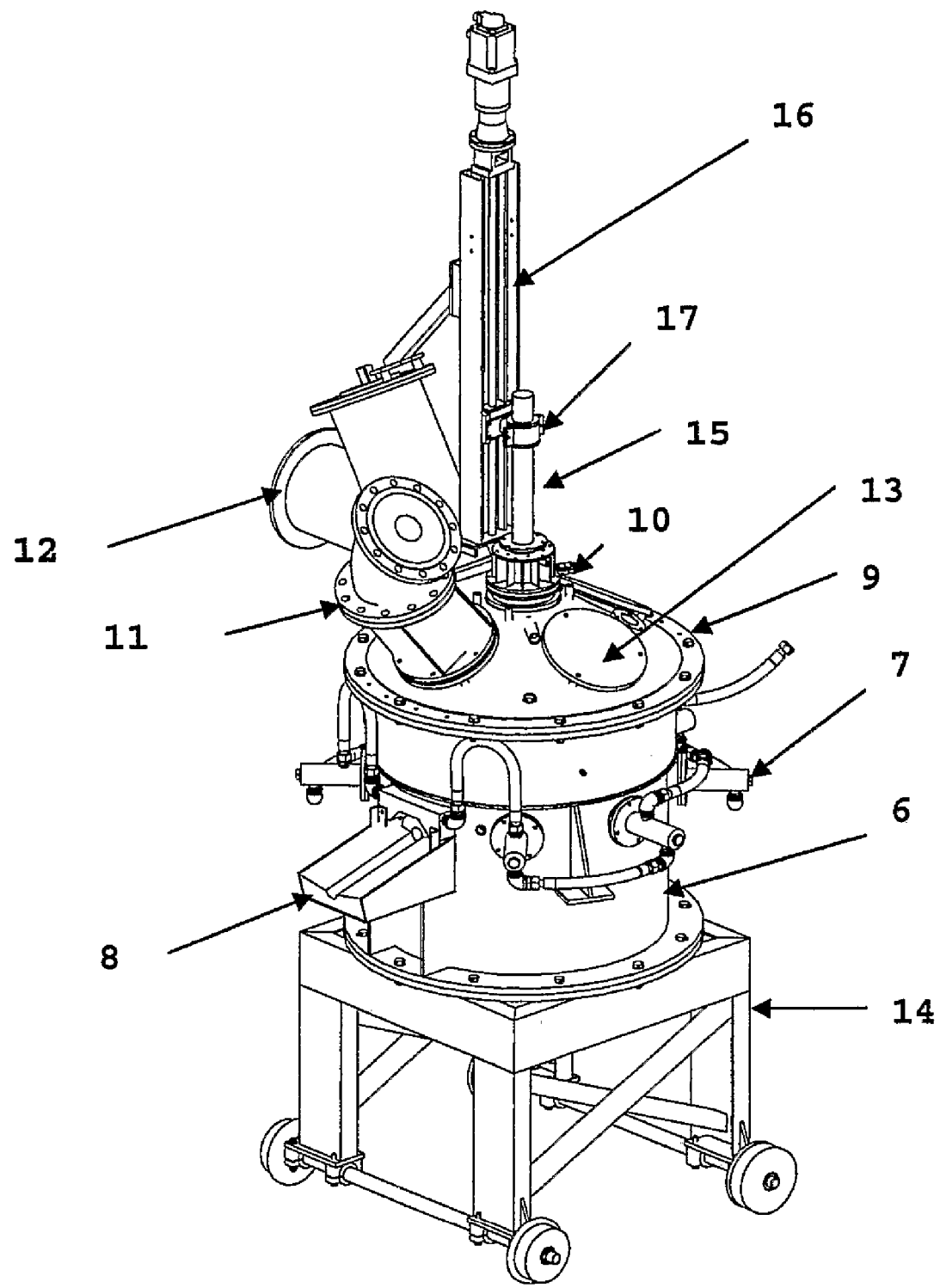
FIG. 4 shows in more detail the plasma furnace of FIG. 3.

A schematic drawing of the plasma converter (excluding the electrode and manipulator arrangement) is given in FIG. 4 and comprises the following sections:

i) A refractory-lined mild steel shell 6 with an additional double skinned water cooling jacket in the upper shell section and a series of water cooled copper fingers 7 which provide additional protection for the refractories at the slag line. The refractory is a cast alumina spinel containing 91% $Al_2O_3$, 7% MgO and 2% CaO with a maximum service limit of 1800° C. A 150 mm diameter cylindrical steel bar in the base of the converter provides the return (anode) electrode for single electrode operation. A taphole 8 in the furnace hearth allows for intermittent removal of the molten slag. The converter has apertures in the upper shell region for pressure monitoring and for camera viewing. The refractory temperatures are monitored at eight locations using B-type thermocouples (up to 1800° C.) and in the return electrode at two locations using K-type thermocouples (up to 1300° C.).

ii) A conical mild steel, refractory-lined, water jacketed roof 9 with five large apertures: a central port for single electrode work 10, a side port for gas feed from the FBG feed 11 a off-gas port 12 and a port for solids feeding of the oversized bed material (not shown) and a spare general access port 13. There is also a smaller camera port housing a small remote video camera in a protective case which allows for viewing of the inside of the plasma converter. There are two thermocouple holes for refractory temperature monitoring as above. The roof also provides location points for electrode manipulators and for the off gas ducting.

iii) A steel support stand 14, mounted on heavy-duty wheels and railway tracks for easy removal and installation of the plasma converter.

iv) Electrode 15 and Manipulator System 16 where the cathode electrode motion is controlled by a central, single axis manipulator (vertical only), consisting of a heavy-duty linear slideway actuated via a servo-motor and gearbox. The electrode clamping device 17 is fixed to the carriage plate and the whole assembly is mounted on electrically insulating ceramic and fibreglass rings and spacers to prevent side arcing of the plasma device. The base of the manipulator is surmounted by a seal assembly containing a water cooled packing gland type seal for the torch or electrode to pass through into the plasma converter. Electrode diameters of up to 100 mm can be accommodated through this central port and the maximum stroke is 1000 mm. The graphite electrode is centrally drilled and inert plasma gas is injected through this conduit.

The use of the single manipulator allows for single electrode (cathode) operating mode and the return path for the current is via a steel return electrode in the base of the converter (anode).

In operation, the dirty offgas from the gasifer flows via a refractory lined duct to the plasma converter. Additional oxygen and steam is axially injected into the gas stream at the point of entry into the converter.

The high temperature and addition of oxidants at the converter stage promotes the cracking and reforming of organic species and gasification of sooty and char products. The power to the plasma arc is controlled to maintain a temperature of gases exiting the unit to ~1000-1300° C. Ash particulates that are carried over from the gasifier will drop out and be assimilated in the melt. After treatment in the converter unit the syngas exits via a second gas port in the base of the unit.

Example 1

Treatment of Biomass Wood Pellet

The general methodology for treating the wood pellet is as given above. The rate of feed of wood pellets to the gasifer averaged 42 kg/h. A summary of the operating conditions employed in the FBG to maintain the bed temperature at around 800° C. and at the plasma converter to give an (estimated) exhaust temperature of 1250° C. is given in table 4. These figures are in close correlation to the theoretically derived operating requirements.

TABLE 4

Example operating conditions for the treatment of biomass (wood pellet)

| Item | Gasifier | Plasma Converter |
|---|---|---|
| RDF Feed Input (kg/h) | 42 | |
| Power input (kW) | | 79 |
| Argon (lpm) | 50 | 130 |
| Oxygen (Nlpm) | 189 | 61 |
| Steam (kg/h) | 14 | 0 |

Example 2

Treatment of RDF Material

The methodology for the treatment of the RDF material is as given above. The RDF was obtained from a commercial thermal treatment plant. The general composition of this material is given in table 1 above. The materials was fed at an average rate of 40.5 kg/h to the gasifier. A summary of the operating conditions employed in the FBG to maintain the bed temperature at around 800° C. and at the plasma converter to give an (estimated) exhaust temperature of 1250° C. is given in table 5. It was observed that there was again good correlation between the theoretical and experimentally derived values.

TABLE 5

Example operating conditions for the treatment of refuse derived fuel

| Item | Gasifier | Plasma Converter |
|---|---|---|
| RDF Feed Input (kg/h) | 40.5 | — |
| Power input (kW) | — | 70 |
| Argon (lpm) | 50 | 130 |
| Oxyge (Nlpm) | 189 | 61 |
| Steam (kg/h) | 14 | 0 |

The invention claimed is:

1. A process for the treatment of waste, the process comprising:
   (i) a gasification step comprising treating the waste in a gasification unit in the presence of oxygen and steam to produce an offgas and a non-airborne, solid char material; and
   (ii) a plasma treatment step comprising subjecting all said offgas and the non-airborne, solid char material to a plasma treatment in a plasma treatment unit in the presence of oxygen and, optionally, steam, wherein the plasma treatment unit is separate from the gasification unit.

2. The process of claim 1 further comprising a pyrolysis step prior to the gasification step.

3. A process as claimed in claim 1 wherein the waste is gasified during the gasification step at a temperature greater than 650° C.

4. A process as claimed in claim 3, wherein the waste is gasified during the gasification step at a temperature of from 800° C. to 950° C.

5. A process as claimed in claim 1 wherein the amount of oxygen introduced to the gasification unit during the gasification step is from 300 to 350 kg per 1000 kg of waste fed into the gasification unit.

6. A process as claimed in claim 1 wherein the amount of steam introduced to the gasification unit during the gasification step is up to 300 kg per 1000 kg of waste fed into the gasification unit.

7. A process as claimed in claim 1 wherein the waste contains less than 20% by weight of moisture and the amount of steam introduced to the gasification unit during the gasification step is from 300 to 350 kg per 1000 kg of waste fed to the gasification unit.

8. A process as claimed claim 1 wherein the waste contains 20% or more by weight of moisture and the amount of steam introduced to the gasification unit during the gasification step is from 0 to 150 kg per 1000 kg of waste fed to the gasification unit.

9. A process as claimed in claim 1 wherein the gasification step is carried out in a fluid bed gasification unit.

10. A process as claimed in claim 1 wherein the waste is fed to the gasification unit through an air-lock device.

11. A process as claimed in claim 1, wherein the process further comprises subjecting the waste to a microbial digestion step prior to the gasification step.

12. A process as claimed in claim 11, wherein the microbial digestion is aerobic microbial digestion.

13. A process as claimed in claim 12, wherein the microbial digestion is carried out in an aerobic microbial digestion unit in which the oxygen content of the gas in the unit is not less than 5% by volume.

14. A process as claimed in claim 12, wherein the aerobic microbial digestion is carried out in a rotary aerobic digestion unit.

15. A process as claimed in claim 14, wherein the waste is rotated in the rotary aerobic digestion unit at a rate of from one revolution every minute to one revolution every ten minutes.

16. A process as claimed in claim 11, wherein the moisture content of the waste prior to microbial digestion is from 20 to 75% by weight.

17. A process as claimed in claim 11, wherein the waste has an average moisture level of 30% or less by weight after the microbial digestion treatment.

18. A process as claimed in claim 1 wherein the gasification unit and the plasma treatment unit are in fluid connection.

19. A process as claimed in claim 1, wherein the ratio of oxygen to steam in the plasma treatment step is from 10:1 to 2:5, by weight.

20. A process as claimed in claim 1, wherein the plasma treatment of the waste is carried out at a temperature of from 1100 to 1600° C.

21. A process as claimed in claim 1, wherein the plasma treatment of the waste is carried out in the presence of a plasma stabilizing gas.

22. A process as claimed in claim 21, wherein the plasma stabilizing gas is selected from one or more of nitrogen, argon, hydrogen, carbon monoxide, carbon dioxide and steam.

23. A process as claimed in claim 1, further comprising collecting the gas produced in the plasma treatment unit.

24. A process as claimed in claim 1, further comprising collecting the solid and/or molten material produced in the plasma treatment unit.

25. A process as claimed in claim 1, wherein the gas produced from the gas plasma treatment is used in a gas engine or gas turbine to generate electricity.

26. A process as claimed in claim 2, wherein the waste is pyrolysed during the pyrolysis step at a temperature of 400° C. or more.

27. A process as claimed in claim 1, further comprising the step of drying the waste before its treatment in the gasification step.

28. A process as claimed in claim 27, wherein waste is dried by using the heat produced in any of the other steps of the process.

29. A process as claimed in claim 27, wherein the waste is dried by blowing heated air or steam over or through the waste.

30. A process as claimed in claim 27, wherein the moisture content of the waste immediately before treatment in the gasification is 20% or less by weight.

31. A process as claimed in claim 30, wherein the moisture content of the waste immediately before treatment in the gasification step is 15% or less by weight.

32. An apparatus for carrying out the process as defined in claim 1, the apparatus comprising:
- (i) a gasification unit and
- (ii) a plasma treatment unit which is separate from the gasification unit, wherein the gasification unit has an inlet for oxygen and optionally an inlet for steam and the plasma treatment unit has an inlet for oxygen and optionally an inlet for steam, and means are provided for transporting all said offgas and the solid, non-airborne char material from the gasification unit to the plasma treatment unit.

33. An apparatus for carrying out the process as defined in claim 11, the apparatus comprising:
- (i) a microbial digestion unit,
- (ii) a gasification unit which is separate from the microbial digestion unit, and
- (iii) a plasma treatment unit wherein the gasification unit has an inlet for oxygen and optionally an inlet for steam and the plasma treatment unit has an inlet for oxygen and optionally an inlet for steam, and means are provided for transporting all said offgas and the solid, non-airborne char material from the gasification unit to the plasma treatment unit.

34. An apparatus as claimed in claim 32, wherein the gasification unit is adapted to gasify the waste at a temperature of more than 650° C.

35. An apparatus as claimed in claim 32, wherein the gasification unit is adapted to gasify the waste at a temperature of at least 800° C.

36. An apparatus as claimed in claim 32, wherein the gasification unit contains an airlock device through which the waste can be introduced into the gasification unit.

37. An apparatus as claimed in claim 32, the apparatus further comprising a unit for microbial digestion of waste.

38. An apparatus as claimed in claim 37, wherein the unit for the microbial digestion of waste is a rotary aerobic digestion unit.

39. An apparatus as claimed in claim 32, wherein the apparatus comprises a microbial digestion unit, and the microbial digestion unit is in fluid connection with the gasification unit, and the gasification unit is in fluid connection with the plasma treatment unit, to allow waste treated from the microbial treatment to be transported to the gasification unit, and to allow offgas and char resulting from the gasification step to be transported to the plasma treatment unit.

40. An apparatus as claimed in claim 39, wherein the apparatus is adapted to treat the waste in a continuous process.

41. An apparatus as claimed in claim 32, further comprising a gas engine or gas turbine for generating electricity, the turbine being in fluid connection with the plasma unit, so that the plasma-treated gas from the plasma unit can be fed to the turbine.

42. An apparatus as claimed in claim 32, further comprising a pyrolysis unit.

43. An apparatus as claimed in claim 33, further comprising a pyrolysis unit.

44. An apparatus as claimed in claim 42, wherein the pyrolysis unit is adapted to pyrolyse the waste at a temperature of at least 400° C.

45. A process as claimed in claim 1, wherein the waste comprises refuse derived fuel.

46. The process of claim 11 further comprising a pyrolysis step prior to the gasification step and after said microbial digestion step.

* * * * *